United States Patent
Okada et al.

(10) Patent No.: US 9,791,344 B2
(45) Date of Patent: Oct. 17, 2017

(54) CALIBRATION METHOD FOR MULTI-COMPONENT FORCE DETECTOR PROVIDED IN ROLLING RESISTANCE TESTING MACHINE

(71) Applicant: Kobe Steel, Ltd., Hyogo (JP)

(72) Inventors: Toru Okada, Kobe (JP); Takayuki Fukuda, Takasago (JP); Takashi Sumitani, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 68 days.

(21) Appl. No.: 14/397,246

(22) PCT Filed: Jun. 12, 2013

(86) PCT No.: PCT/JP2013/066206
§ 371 (c)(1),
(2) Date: Oct. 27, 2014

(87) PCT Pub. No.: WO2013/191055
PCT Pub. Date: Dec. 27, 2013

(65) Prior Publication Data
US 2015/0143868 A1 May 28, 2015

(30) Foreign Application Priority Data
Jun. 20, 2012 (JP) ................................ 2012-138368

(51) Int. Cl.
*G01L 25/00* (2006.01)
*G01M 17/02* (2006.01)

(52) U.S. Cl.
CPC ............. *G01L 25/00* (2013.01); *G01M 17/02* (2013.01); *G01M 17/022* (2013.01)

(58) Field of Classification Search
CPC ............................ G01M 17/022; G01L 25/00
(Continued)

(56) References Cited

U.S. PATENT DOCUMENTS

| 2,582,886 A | * | 1/1952 | Ruge .......................... G01G 3/02 |
| | | | 177/211 |
| 4,197,736 A | | 4/1980 | Barrett |

(Continued)

FOREIGN PATENT DOCUMENTS

| JP | S59-151032 A | 8/1984 |
| JP | S61-116637 A | 6/1986 |

(Continued)

OTHER PUBLICATIONS

International Search Report; PCT/JP2013/066206; dated Jul. 23, 2013.

(Continued)

*Primary Examiner* — R. A. Smith
*Assistant Examiner* — John M Royston
(74) *Attorney, Agent, or Firm* — Studebaker & Brackett PC

(57) ABSTRACT

The calibration method for a multi-component force detector is a calibration method for a multi-component force detector provided in a rolling resistance testing machine comprising a spindle to which a tire is mounted, and a traveling drum having a simulated traveling road surface against which the tire is pressed, wherein when processing for calculating force acting on the tire from the measurement value of the multi-component force detector using a crosstalk correction factor for correcting the influence of crosstalk occurring in the multi-component force detector is performed, a test is conducted using at least one or more reference tire the rolling resistance value of which is already known, and the crosstalk correction factor is calibrated using "rolling test data" composed of force measured by the multi-component force detector during the test using the reference tire, and the rolling resistance value of the reference tire used for the measurement.

6 Claims, 3 Drawing Sheets

(58) Field of Classification Search
USPC .......................................................... 73/1.15
See application file for complete search history.

(56) References Cited

U.S. PATENT DOCUMENTS

| | | | | |
|---|---|---|---|---|
| 4,344,324 A | * | 8/1982 | Langer | G01M 17/022 198/837 |
| 5,572,440 A | * | 11/1996 | Harashima | G01M 7/06 700/280 |
| 2002/0104366 A1 | * | 8/2002 | Sinnett | G01M 17/022 73/1.01 |
| 2008/0115563 A1 | * | 5/2008 | Potts | G01N 19/02 73/9 |
| 2011/0000292 A1 | * | 1/2011 | Yoshikawa | G01M 17/021 73/146 |
| 2011/0138899 A1 | * | 6/2011 | Inoue | G01M 17/022 73/146 |
| 2012/0079868 A1 | | 4/2012 | Okada et al. | |

FOREIGN PATENT DOCUMENTS

| | | |
|---|---|---|
| JP | H02-115739 A | 4/1990 |
| JP | 2819136 B2 | 10/1998 |
| JP | 2000-304632 A | 11/2000 |
| JP | 2003-004598 A | 1/2003 |
| JP | 2012-078286 A | 4/2012 |
| WO | 2010/101159 A1 | 9/2010 |

OTHER PUBLICATIONS

Written Opinion of the International Searching Authority; PCT/JP2013/066206; dated Jul. 23, 2013.

* cited by examiner

CALIBRATION METHOD FOR MULTI-COMPONENT FORCE DETECTOR PROVIDED IN ROLLING RESISTANCE TESTING MACHINE

TECHNICAL FIELD

The present invention relates to a calibration method for a multi-component force detector provided in a rolling resistance testing machine.

BACKGROUND ART

When the nature and performance of tires for trucks, passenger cars, and other vehicles are measured, one of important measurement items is rolling resistance of the tire. The rolling resistance of the tire is a tangential force acting between the tire and the ground. In a rolling resistance testing machine, the rolling resistance is measured as a force Fx (a change in rolling resistance Fx when a pressing load Fz is changed) that acts between a testing tire and a simulated traveling road surface such as a drum in a tangential direction.

A method based on a drum type rolling resistance testing machine is representative of a method of measuring the rolling resistance Fx. The drum type rolling resistance testing machine is configured to bring a tire into contact with a simulated traveling road surface formed on an outer circumference of a traveling drum in a pressed state, and to measure a relation between the pressing load Fz and the rolling resistance Fx using a multi-component force detector (load cell) provided for a spindle supporting the tire.

To be specific, when the rolling resistance Fx is measured, a load fx is measured in a rolling resistance direction by the multi-component force detector provided for the spindle, and Fx can be calculated (load method) by "Fx=fx(L/Rd)" where Rd is a radius of the traveling drum, and L is an interaxial distance between the traveling drum and the tire spindle. Further, as another method, there is also a method (torque method) of measuring drive torque τ for rotating the traveling drum and measuring the rolling resistance Fx by "Fx=τ/Rd."

Incidentally, in such a rolling resistance testing machine, it is necessary to calibrate the multi-component force detector at the time of using the testing machine. In addition, when the multi-component force detector is continuously used over a long time, an error in a detected value occurs. As such, the multi-component force detector needs to be calibrated, for instance, at every fixed time.

As a method of calibrating the multi-component force detector, various methods are developed. However, as illustrated in Patent Document 1, there is a method of performing calibration after a test load is applied in each direction using a weight whose mass is known. Further, as illustrated in Patent Documents 2 and 3, a method of performing calibration by providing an external force via a high-precision load tester is also disclosed.

CITATION LIST

Patent Document

Patent Document 1: JP S59-151032 A
Patent Document 2: JP S61-116637 A
Patent Document 3: JP 2003-004598 A

SUMMARY OF THE INVENTION

Incidentally, in a meter for simultaneously measuring multiple forces (a translational load component and a moment component) like the multi-component force detector, there occurs a phenomenon called "crosstalk" that measures a load (false load) even in a direction different from a direction of an originally applied load.

Especially, in the multi-component force detector provided for the rolling resistance testing machine, the crosstalk, for instance, by which the pressing load has an influence on a rolling load becomes an issue.

That is, the pressing load Fz of the tire is typically an order of about 100 times of the rolling resistance Fx, and a lateral force Fy of the tire becomes a load having an order of about 10 times of Fx. Further, since the center of the tire structurally becomes a position offset from the multi-component force detector, moment mx also acts on the multi-component force detector as a relatively great value due to a load Fz. Accordingly, the crosstalk influence is not negligible, and an output value fx' of an x direction of the multi-component force detector does not represent a correct value by receiving an influence of loads other than the x direction. Further, if a direction in which the axial load (pressing load) deviates even slightly, test conditions are changed, and a calibration test itself is not satisfactorily made. For example, when the axial load Fz of 5000N is provided, if there is an error of even 0.1 degrees in a pressing direction thereof, a load of 9 N is additionally applied in the x direction, and the test conditions themselves deviate from desired ones. Of course, on the test conditions that are not properly determined in this way, it is also difficult to calibrate a crosstalk correction coefficient with high accuracy.

To examine this crosstalk, it is considered that a known load is provided in the x direction using the technique of Patent Document 1, and an influence, in which the known load exerts in y- and z-axial directions is measured. However, this method is not practical because there is a need for a calibration test that provides Fy and Fz as well as Mx, My, and Mz in addition to Fx as the values given to the multi-component force detector, and it takes labor.

In Patent Documents 2 and 3 as described above, although the calibrating method of the multi-component force detector which considers the crosstalk influence is partly disclosed, a specific technique is not disclosed and is far from a technique that can be employed in the actual field.

The present invention has been made keeping in mind the above problems, and an object of the present invention is to provide a calibration method capable of calibrating a crosstalk correction coefficient of a multi-component force detector provided in a rolling resistance testing machine with ease and high accuracy.

To achieve the object, the present invention adopts the following technical means.

That is, the present invention is to provide calibration method for a multi-component force detector provided for a rolling resistance testing machine that has a spindle on which a tire is mounted and a traveling drum with a simulated traveling road surface against which the tire is pressed. The calibration method includes: performing a test using at least one reference tire whose rolling resistance value is known to thereby obtain rolling test data made up of a force measured by the multi-component force detector during the test using the reference tire; calibrating a crosstalk correction coefficient for correcting an influence of crosstalk occurring at the multi-component force detector using the rolling test data and the rolling resistance value of the reference tire.

The inventors thought that, when the reference tire whose rolling resistance value is known is tested in the situation that the measurement value of the multi-component force detector is calibrated with satisfactory precision in an axial direction thereof, there is a difference between the measuring result of the multi-component force detector and the rolling resistance value of the reference tire, and such a difference is mainly attributed to the influence of crosstalk caused by the action of other loads. Accordingly, the inventors found that, if the crosstalk correction coefficient was calibrated by equalizing both of the rolling resistances, easy and highly accurate calibration was possible, and completed the present invention.

The aforementioned reference tire refers to a tire whose rolling resistance value is measured by a reference testing machine defined in JISD4234, etc. JISD4234 defines a method of measuring rolling resistance of a testing new tire under a controlled laboratory condition at a pneumatic tire designed for passenger cars, trucks, and buses. JISD4234 also defines a method of finding a measuring result correlation based on a matching process using reference tire measured by the reference testing machine in order to enable comparison between the testing machines. The reference tire is sold in Japan as well, and is readily available to those skilled in the art.

Preferably, the multi-component force detector may be mounted on the spindle. When a tangential direction of the traveling drum is set as an x axis, a shaft center direction of the spindle is set as a y axis, and a direction of a load applied to the tire is set as a z axis, the multi-component force detector may measure, among a force acting in an x-axial direction, a force acting in a y-axial direction, a force acting in a z-axial direction, and moment around the x axis, moment around the y axis, and moment around the z axis, two or more containing at least the force acting in the x-axial direction and the force acting in the z-axial direction.

More preferably, when configured to measure the force acting in the x-axial direction, the force acting in the z-axial direction, and the moment around the x axis, the multi-component force detector may calibrate a crosstalk correction coefficient of the force acting in the z-axial direction relative to the force acting in the x-axial direction and a crosstalk correction coefficient of the moment around the x axis relative to the force acting in the x-axial direction using the rolling test data which contains the force acting in the x-axial direction, the force acting in the z-axial direction, and the moment around the x axis, and two types of which are at least primarily independent.

The force fz acting in the z-axial direction and the moment mx around the x axis easily exerts an influence of crosstalk on the moment fx around the x axis among loads and moments measured by the multi-component force detector. Accordingly, with respect to the multi-component force detector that can at least detect the force fx acting in the x-axial direction, the force fz acting in the z-axial direction, and the moment mx around the x axis, the crosstalk correction coefficients of the force fz acting in the z-axial direction and the moment mx around the x axis relative to the force fx acting in the x-axial direction may be calibrated.

Preferably, when configured to measure the force acting in the x-axial direction, the force acting in the z-axial direction, and the force acting in the y-axial direction, the multi-component force detector may calibrate a crosstalk correction coefficient of the force acting in the z-axial direction relative to the force acting in the x-axial direction and a crosstalk correction coefficient of the force acting in the y-axial direction relative to the force acting in the x-axial direction using the rolling test data which contains the force acting in the x-axial direction, the force acting in the z-axial direction, and the force acting in the y-axial direction, and two types of which are at least primarily independent.

The moment mx around the x axis measured by the multi-component force detector includes a product of a tire radius r and the force fy acting in the y-axial direction, and has a high correlation with a lateral force (force acting in the y-axial direction) fy of the tire. Accordingly, with respect to the multi-component force detector that measures translational loads of the force fx acting in the x-axial direction, the force fy acting in the y-axial direction, and the force fz acting in the z-axial direction, the crosstalk correction coefficients of the force fz acting in the z-axial direction and the force fy acting in the z-axial direction relative to the force fx acting in the x-axial direction may be calibrated using the force fy acting in the y-axial direction in place of the moment mx around the x axis.

Preferably, when configured to measure the force acting in the x-axial direction, the force acting in the z-axial direction, the force acting in the y-axial direction, and the moment around the x axis, the multi-component force detector may calibrate a crosstalk correction coefficient of the force acting in the z-axial direction relative to the force acting in the x-axial direction, a crosstalk correction coefficient of the force acting in the y-axial direction relative to the force acting in the x-axial direction, and a crosstalk correction coefficient of the moment around the x axis relative to the force acting in the x-axial direction using the rolling test data which contains the force acting in the x-axial direction, the force acting in the z-axial direction, the force acting in the y-axial direction, and the moment around the x axis, and three types of which are at least primarily independent.

With respect to the multi-component force detector that can measure all of the force fx acting in the x-axial direction, the force fz acting in the z-axial direction, the force fy acting in the y-axial direction, and the moment mx around the x axis, all of the crosstalk correction coefficients of the force fz acting in the z-axial direction, the force fy acting in the y-axial direction, and the moment mx around the x axis relative to the force fx acting in the x-axial direction are calibrated. Thereby, more highly accurate calibration of the multi-component force detector is possible.

Further, the calibration method may include obtaining a differential load by which a measurement value of the multi-component force detector which is obtained when the tire is pushed by a load different from a test load is subtracted from a measurement value of the multi-component force detector which is obtained when the tire is pushed against the traveling drum by the test load, and calibrating the crosstalk correction coefficient using the differential load as the rolling test data.

A considerable influence of rotational friction is present at the bearings provided for the rotary shaft of a spindle or a rotary drum mounting the tire. When the rotational friction is added to the measurement value of a rolling resistance force, it is difficult to measure fx or to calibrate the crosstalk correction coefficient with precision. Thus, if the crosstalk correction coefficient is calibrated using the differential load obtained by subtracting a state in which a load (for instance, a skim load) different from the test load is applied from a state in which the test load is applied, the calibration can be performed while excluding the influence of rotational friction, and the crosstalk correction coefficient can be accurately calibrated.

According to the calibration method for the multi-component force detector provided for the rolling resistance testing machine of the present invention, the crosstalk correction coefficient of the multi-component force detector provided for the rolling resistance testing machine can be calibrated in an easy and accurate way.

DESCRIPTION OF EMBODIMENTS

Figure 1A:
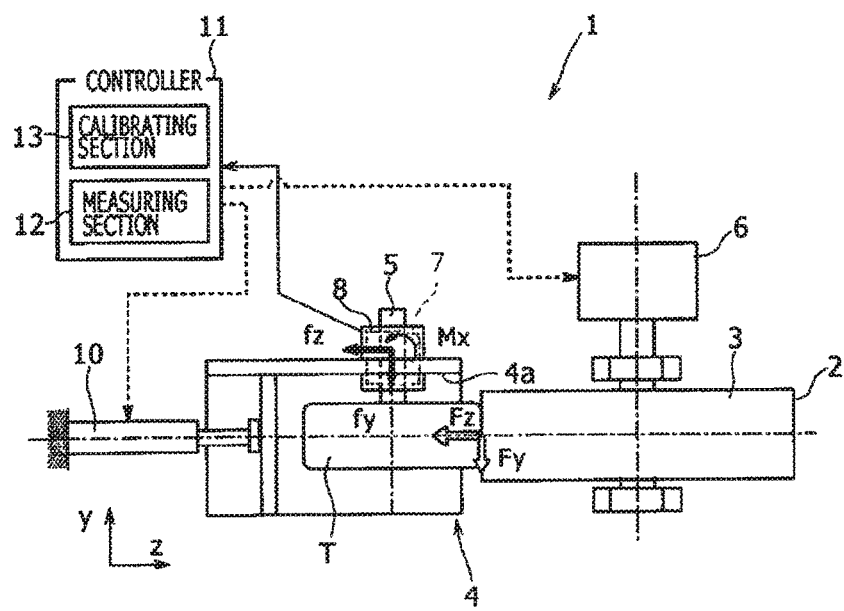
FIG. 1A is a plan view of a rolling resistance testing machine provided with a multi-component force detector calibrated by a calibration method of the present invention.

Hereinafter, a rolling resistance testing machine 1 provided with a multi-component force detector 7 calibrated by a calibration method of the present invention will be described based on the drawings.

The rolling resistance testing machine 1 of the present invention includes a cylindrical traveling drum 3, on an outer circumferential surface of which a simulated traveling road surface 2 on which a tire (either a testing tire or a reference tire) T travels is provided, and a carriage 4 that presses the tire T against the simulated traveling road surface 2 of the traveling drum 3. The carriage 4 is a slide stand that mounts a spindle 5 holding the tire T in a rotatable way, and is disposed apart from the traveling drum 3 in a horizontal direction.

Figure 1B:
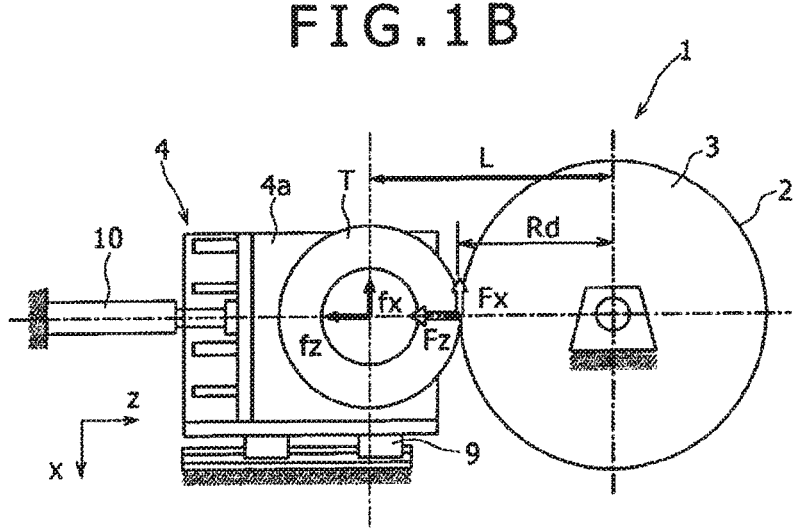
FIG. 1B is a front view of the rolling resistance testing machine of FIG. 1A.

In the following description, the left side of FIG. 1B is set as the left side when describing the rolling resistance testing machine 1, and the right side of FIG. 1B is set as the right side.

The traveling drum 3 is a cylinder that is mounted to be rotatable around an axis running in a horizontal direction perpendicular to a leftward/rightward direction, and the endless simulated traveling road surface 2 on which the tire T can roll is formed on the outer circumferential surface thereof. A motor 6 rotating the traveling drum 3 is mounted on a rotary shaft of the traveling drum 3, and the traveling drum 3 can be driven by the motor 6.

Figure 2:
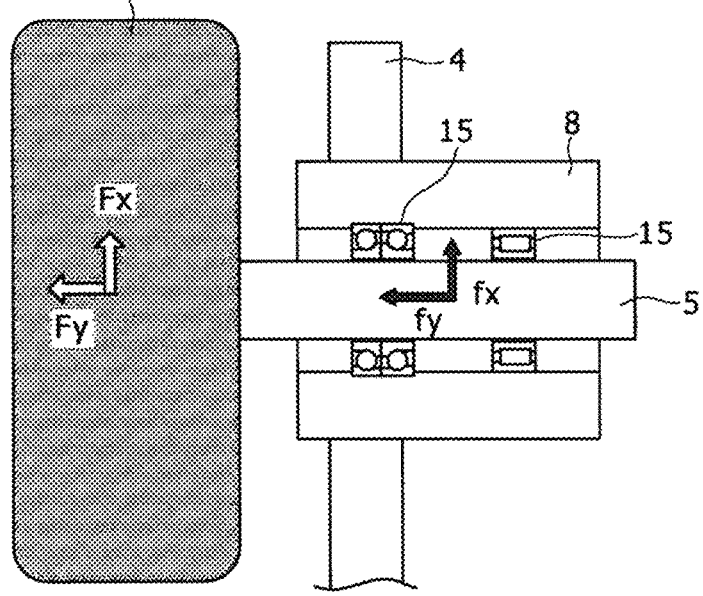
FIG. 2 is an enlarged view of a spindle.

On the other hand, as illustrated in FIG. 2, the carriage 4 is a slide stand having a structure with good rigidity so as not to be deformed when the load is applied. A vertical wall section 4a of the carriage 4 is provided with a hollow cylindrical housing 8 into which the spindle 5 is inserted such that a shaft center of the housing 8 becomes parallel with that of the traveling drum 3. The spindle 5 is rotatably inserted in an inner circumferential surface of the housing 8 via bearings 15.

A linear guide 9, which causes the carriage 4 to horizontally move in a leftward/rightward direction, is disposed at a lower portion of the carriage 4. Further, a hydraulic cylinder 10 is disposed on a left side of the carriage 4, which moves the carriage 4 in a horizontal direction and presses the tire T mounted on the spindle 5 so as to be able to press the tire T against the traveling drum 3.

The aforementioned spindle 5 is a shaft member that can hold the tire T at a tip thereof, and is mounted in a state in which it is inserted into the cylindrical housing 8 to be rotatable around an axis facing the horizontal direction. The rotary shaft center of the spindle 5 is disposed to be flush and parallel with the rotary shaft center of the traveling drum 3 in an upward/downward direction, and is adapted to cause the tire T mounted on the spindle 5 to be pushed against the simulated traveling road surface 2 of the traveling drum 3 from a normal direction of the simulated traveling road surface 2 when the carriage 4 is horizontally moved. The multi-component force detector 7 is provided in the housing 8 that rotatably supports the spindle 5.

The multi-component force detector 7 has a disc shape in appearance, and is made up of multiple bridge members (strain bodies) that radially extend from the center thereof in a radial direction and load cells mounted on the bridge members. The multi-component force detector 7 has the bearings 15 arranged in the center thereof, and rotatably supports the spindle 5. An outer circumference of the multi-component force detector 7 is adapted to be connected to an end of the housing 8.

When setting coordinate axes as illustrated in FIGS. 1A and 1B, namely a z axis facing a movement direction of the carriage 4 (direction in which an axial load is provided), a y axis that is the same axis as the shaft center of the spindle 5, and an x axis that has a direction perpendicular to the z and y axes and faces a direction tangential to the outer circumference of the traveling drum 3, the multi-component force detector 7 detects at least two or more including fx and fz among loads fx, fy, and fz running along these coordinate axes and moments mx, my, and mz around these coordinate axes. When a force acting on the tire T is represented, a capital letter F is adapted to be used (for example, Fx, Fy, and Fz).

A load measured by the multi-component force detector 7 is sent to a controller 11.

As illustrated in FIG. 1A, the controller 11 controls the hydraulic cylinder 10 that presses the carriage 4 toward the traveling drum 3, and the motor 6 that drives and rotates the traveling drum 3.

Further, the controller 11 includes a measuring section 12 that calculates true rolling resistance Fx or the like based on measurement data measured by the multi-component force detector 7. In the measuring section 12, load measurement values such as fx', fz', and mx' measured by the multi-component force detector 7 are input, and fx is calculated using formula (1) below. In formula (1), for instance, coefficients a and b or the like are present, but the coefficients a and b are coefficients that correct the crosstalk influence in the multi-component force detector 7. To accurately know the coefficients a and b, in other words, to accurately calibrate the coefficients a and b is essential to accurately calculate fx in the measuring section 12.

Incidentally, although the coefficients a and b or the like are accurately calibrated, when the rolling resistance testing machine 1 is used over a long time, there occurs a situation in which a value of fx deviates and the true rolling resistance Fx cannot be obtained. The reason such a situation occurs includes various factors. However, as one of the factors, it is considered that the coefficients a and b have deviated from a correct value.

Therefore, the controller 11 provided for the rolling resistance testing machine 1 of the present invention is provided with a calibrating section 13 that allows the coefficients a and b correcting the crosstalk influence to be calibrated to correct values to accurately calculate fx.

Subsequently, signal processing performed by the calibrating section 13 provided inside the controller 11, in other words, a calibration method for the multi-component force detector 7 of the present invention will be described.

The calibration method for the multi-component force detector 7 of the present invention is characterized in that, when a process of calculating the force acting on the tire T from measurement values of the multi-component force detector 7 is performed using the crosstalk correction coefficients a and b correcting the crosstalk influence occurring at the multi-component force detector 7, the crosstalk correction coefficients a and b are calibrated using "rolling test data" made up of a force measured by the multi-component force detector 7 at a test of the reference tire and a rolling resistance value of the reference tire. A rolling resistance measurement test of the reference tire which is performed for the calibration is made by a method specified by JISD4234.

To be specific, in the calibration method for the multi-component force detector 7 of the present invention, first to fourth embodiments are considered according to a type of load measured by the multi-component force detector 7, that is, a type of "rolling test data" obtained from the multi-component force detector 7.

First Embodiment

First, a calibration method for a multi-component force detector 7 of a first embodiment will be described.

The calibration method of the first embodiment is employed in the case of using the multi-component force detector 7 capable of measuring fx, fz, and mx.

A crosstalk correction coefficient a of the axial load fz relative to fx and a crosstalk correction coefficient b of mx relative to fx are calibrated in the following order.

Figure 3:
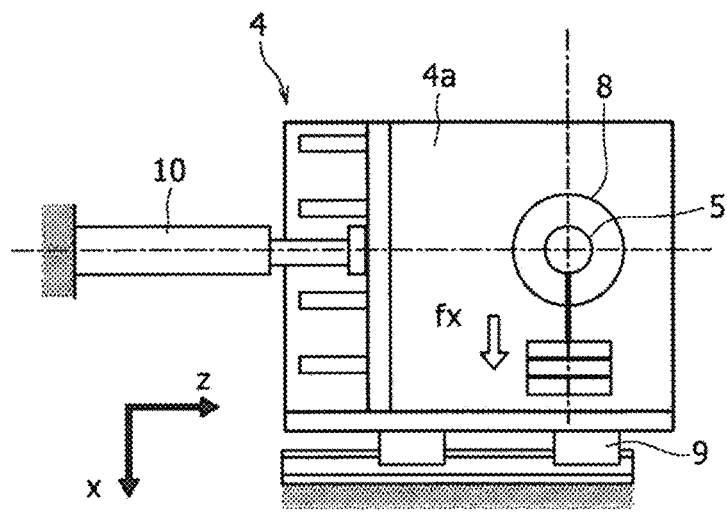
FIG. 3 is a view illustrating a calibration method of calibrating a load component in an x direction using a weight whose mass is known.

First, as illustrated in FIG. 3, calibration is performed by mounting a weight whose mass is known on the spindle 5, applying a load in an x direction, and measuring a load applied in the same direction by the multi-component force detector 7. In this way, a calibration coefficient α of a measurement value fx' of the multi-component force detector 7 relative to fx can be obtained.

Figure 4:
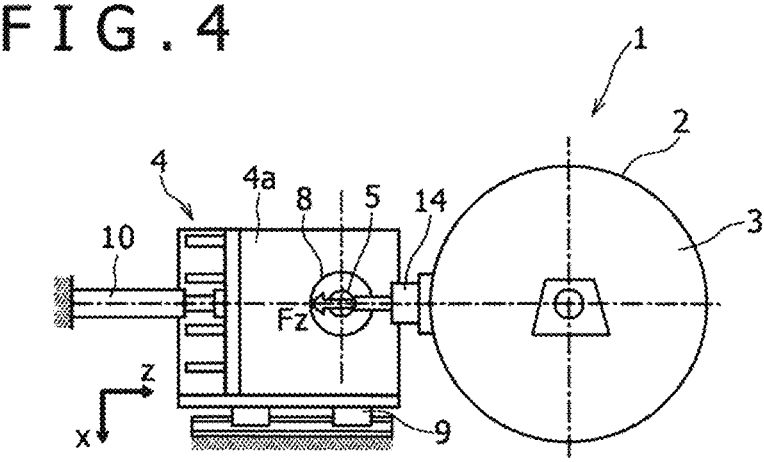
FIG. 4 is a view illustrating a calibration method of offering a load in a z direction.

Further, as illustrated in FIG. 4, a high-precision load tester 14 is installed between the spindle 5 and the traveling drum 3, and the carriage 4 is displaced in a direction of the traveling drum 3. Thereby, a z-directional pressing load fz (=Fz, drum load) is given to the spindle 5.

In this state, a true axial load fz is calibrated, for instance, by obtaining a calibration coefficient from a measurement value of a load fz' output from the multi-component force detector 7 and a signal of the load fz indicated by the load tester 14 as same as the case of the rolling resistance.

In the calibration test illustrated in FIG. 4, the crosstalk correction coefficient a may be obtained. However, since the pressing load fz becomes quite a value compared to fx, although an insignificant installation error is present in the hydraulic cylinder 10, such an extra load as to be negligible is provided in an fx direction. Accordingly, a crosstalk correction coefficient of fz' relative to fx is rarely obtained from the calibration test of providing the load fz in a z direction as illustrated in FIG. 4.

As such, in the present embodiment, the following method is employed for the calibration of the crosstalk correction coefficient.

First, a calibration coefficient α and crosstalk correction coefficients a and b obtained by a method of FIG. 3 are used, thereby fx is represented as in formula (1).

$$fx = \alpha \cdot fx' + a \cdot fz' + b \cdot mx' \quad (1)$$

In formula (1), the coefficient a is a coefficient that indicates a degree of the crosstalk influence resulting from a z-directional measurement value fz', and is a crosstalk correction coefficient of fz'. The coefficient b is a coefficient that indicates a degree of the crosstalk influence resulting from a measurement value mx' of moment around an x axis, and is a crosstalk correction coefficient of mx'.

On the other hand, fx is calculated by formula (2) based on a rolling resistance coefficient Cr of the reference tire which is obtained by a reference testing machine. Lm of formula (2) is a test load.

$$fx = Cr \cdot Lm \quad (2)$$

By equalizing fx obtained from formula (1) above and fx obtained from formula (2), specific numerical values of the crosstalk correction coefficients a and b can be calculated.

$$Cr \cdot Lm = \alpha \cdot fx' + a \cdot fz' + b \cdot mx' \quad (1)'$$

However, since two unknown coefficients a and b are present in formula (1), it is necessary to obtain "rolling test data," at least two types of which are primarily independent, in order to obtain two crosstalk correction coefficients a and b. If the "rolling test data," two or more types of which are primarily independent, is obtained, an independent quadratic simultaneous equation based on formula (1)' can be obtained, and variables a and b can be calculated.

As the method of obtaining two or more types of primarily independent rolling resistance test data, two reference tires having different sizes are typically prepared, and thus "rolling test data" of the respective tires may be obtained.

Further, in a state in which one reference tire is mounted on the spindle 5, test data when the tire is normally rotated and test data when the tire is reversely rotated may be collected. In this case, a positive/negative inverted value is given as the rolling resistance load of the reference tire. Since data obtained by changing rotational speed conditions or a pressing load with respect to one reference tire is not primarily independent, this is not referred to as "rolling test data" of the present invention.

Further, the rolling test data including normal and reverse rotation of the tire is collected multiple times (three times or more), and the obtained rolling test data is processed using a least-squares method. Thereby, it is also possible to calculate the crosstalk correction coefficients a and b with higher precision.

According to the calibration method of the first embodiment described above, the crosstalk correction coefficients a and b of the multi-component force detector 7 provided for the rolling resistance testing machine 1 can be adapted to be calibrated accurately without spending labor or time, and furthermore fx can be accurately obtained.

Second Embodiment

Next, a calibration method for a multi-component force detector 7 of a second embodiment will be described.

Unlike the first embodiment, the calibration method of the second embodiment is to use the multi-component force detector 7 capable of measuring fx, fz, and fy, and to calibrate crosstalk correction coefficients a and c of fz' and fy', respectively relative to fx.

The crosstalk correction coefficients a and c of the second embodiment are calibrated in the following order.

First, as illustrated in FIG. 3, similar to the first embodiment, a calibration coefficient α is obtained, which is included in a measurement value fx' measured with respect to fx in a rolling resistance direction.

Next, when the crosstalk influence of fy' in place of mx' is taken into account, a force fx of the rolling resistance direction is represented as in formula (3). In formula (3), c is a crosstalk correction coefficient caused by a y-directional measurement value fy'.

$$fx = \alpha \cdot fx' + a \cdot fz' + c \cdot fy' \quad (3)$$

Meanwhile, fx is calculated by formula (2) based on a rolling resistance coefficient Cr of the reference tire which is obtained by a reference testing machine. Therefore, the right side of formula (3) and the right side of formula (2) are made equal, thereby formula (3)' can be derived.

$$Cr \cdot Lm = \alpha \cdot fx' + a \cdot fz' + c \cdot fy' \quad (3)'$$

Since two unknown coefficients a and c are present even in formula (3)', it is necessary to obtain "rolling test data," at least two types of which are primarily independent, in order to obtain two crosstalk correction coefficients a and c. If the "rolling test data," two or more types of which are primarily independent, is obtained, an independent quadratic simultaneous equation based on formula (3)' can be obtained, and variables a and c can be calculated.

The primarily independent "rolling test data" can be obtained by a technique similar to that of the first embodiment. For example, since two reference tires having different sizes are typically prepared, "rolling test data" of the respective tires may be obtained. One reference tire may be mounted in a forward or backward direction, and respective test data may be collected.

Operational effects exerted by the calibration method of the second embodiment described above are substantially similar to those of the calibration method of the first embodiment, and thus description thereof will be omitted.

Incidentally, the moment mx around the x axis is represented by formula (4) when a distance from the center of the multi-component force detector 7 to the center of the tire T in a y direction is put as Lt, and a radius of the tire T is put as Rt.

$$mx = -Lt \cdot Fz - Rt \cdot Fy \quad (4)$$

As can be seen from formula (4), when the tire radius Rt is not changed, mx and Fy have a linear relation, which means that a correlation with a lateral force fy of the tire T is high. That is, even when the crosstalk correction coefficient is calibrated using fy in place of mx, a high-precision crosstalk correction coefficient can be obtained as in the first embodiment.

When the tire radius Rt is greatly changed, mx and Fy have a primarily independent relation. As such, as illustrated in a third embodiment, it is necessary to consider both a crosstalk correction coefficient b of mx' relative to fx and a crosstalk correction coefficient c of fy' relative to fx at the same time.

Third Embodiment

Next, a calibration method for a multi-component force detector 7 of a third embodiment will be described.

Unlike the first and second embodiments, the calibration method of the third embodiment is to use the multi-component force detector 7 capable of measuring all of fx, fz, fy, and mx, and to calibrate all of the aforementioned crosstalk correction coefficients a, b and c.

The crosstalk correction coefficients a, b and c of the third embodiment are calibrated in the following order.

First, similar to the first and second embodiments, as illustrated in FIG. 3, a calibration coefficient α of a measurement value fx' relative to fx in a rolling resistance direction is obtained.

Taking into consideration the calibration coefficient α and the crosstalk correction coefficients a, b and c, fx of the present embodiment is represented as in formula (5).

$$fx = \alpha \cdot fx' + a \cdot fz' + b \cdot mx' + c \cdot fy' \quad (5)$$

Meanwhile, fx is calculated by formula (2) based on a rolling resistance coefficient Cr of the reference tire which is obtained by a reference testing machine. Therefore, the right side of formula (5) and the right side of formula (2) are made equal, thereby formula (5)' can be derived.

$$Cr \cdot Lm = \alpha \cdot fx' + a \cdot fz' + b \cdot mx' + c \cdot fy' \quad (5)'$$

Since formula (5)' obtained in this way has three unknown variables, it is necessary to obtain three types of "rolling test data" which are primarily independent, in order to solve the variables (in other words, obtain a calibration matrix made up of the calibration coefficients).

To obtain the three types of "rolling test data," for example, four types of "rolling test data" may be collected by a normal and reverse rotation test of the aforementioned two reference tires, and three of the four types of "rolling test data" may be used.

Further, four types of "rolling test data" may be collected by a normal and reverse rotation test of two reference tires, and the collected rolling test data may be processed by a least-squares method, so that it is also possible to calculate the crosstalk correction coefficients a, b and c having higher precision. It can be evaluated by singular value decomposition whether or not the multiple rolling test data becomes a primarily independent data group.

Since all the crosstalk correction coefficients a, b and c are calibrated by the aforementioned method, fx can be measured with higher precision, and furthermore true rolling resistance Fx can be accurately obtained.

Fourth Embodiment

Next, a calibration method for a multi-component force detector 7 of a fourth embodiment will be described.

When the calibration methods of the first to third embodiments above are performed, a considerable influence of rotational friction is present at the bearings provided for the rotary shaft of the spindle 5 or the rotary drum mounting the tire T. When the rotational friction is added to the measurement value of the rolling resistance, it may be difficult to measure fx' or to calibrate the crosstalk correction coefficient with precision. In such a case, the calibration method described in the fourth embodiment becomes effective.

Figure 5:
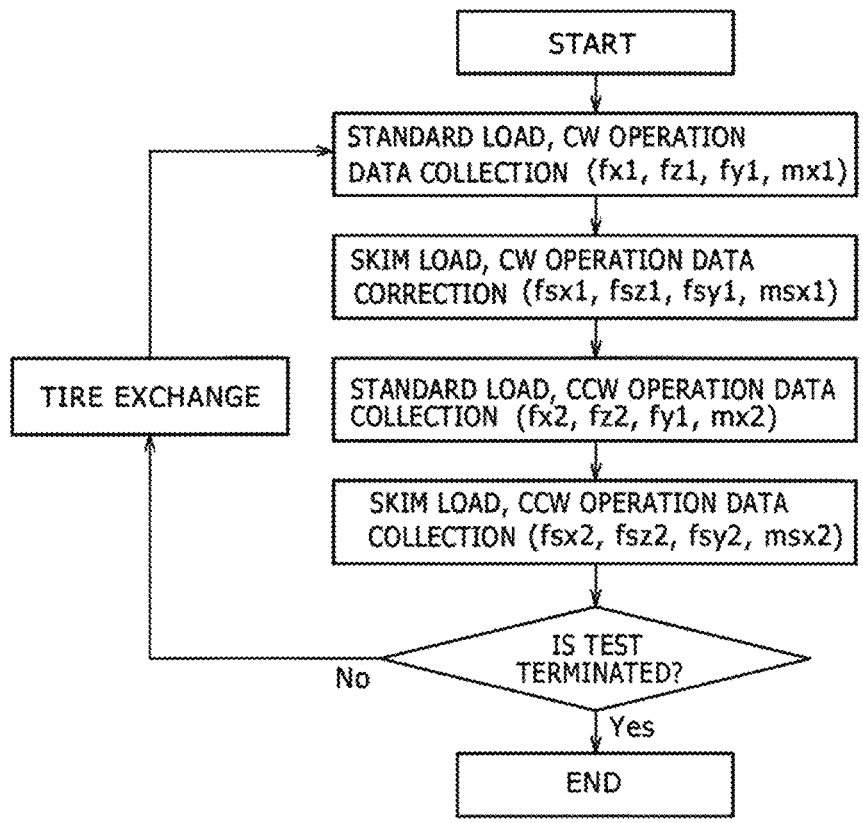
FIG. 5 is a flow chart illustrating a calibration method according to a fourth embodiment.

That is, as illustrated in FIG. 5, the calibration method of the fourth embodiment is to perform calibration by inputting a "differential load" obtained by subtracting a measurement value when the axial load (z-directional pressing load) is obtained by a skim load (or a load different from the test load) from the measurement value when the axial load is obtained by the test load, rather than directly inputting the measurement value, which is measured by the multi-component force detector 7, to fx', fz', fy', and mx' used when obtaining the "rolling test data" in the first to third embodiments above.

The crosstalk correction coefficient of the third embodiment is calibrated in the following order.

First, similar to the first and second embodiments, the calibration coefficient α is obtained, which is included in the measurement value fx' of the rolling resistance with respect to the true rolling resistance fx.

Thus, the tire T is rotated in a clockwise direction (normal rotation direction) CW in a state in which the tire T is pressed against the traveling drum 3 by a standard load (for instance, 5000 N), and fx1, fz1, fy1, and mx1 are measured by the multi-component force detector 7.

Next, the load by which the tire T is pressed against the traveling drum 3 is changed into a skim load (for instance, 100 N) smaller than a standard load, the tire T is rotated in the clockwise direction CW in a state in which the tire T is pressed against the traveling drum 3 by the skim load, and fsx1, fsz1, fsy1, and msx1 are measured by the multi-component force detector 7. In this case, the rolling resistance itself becomes a small value. The conditions other than the axial load, and the tire traveling speed are the same.

In both the skim load and the standard load, a load component or a torque component derived from the rotational friction occurring at the bearings of the spindle 5 or the traveling drum 3 are overlapped as an error proportion, and a measurement value obtained by the skim load is subtracted from a measurement value obtained by the test load as shown in formula (6). Thereby, fx1', fz1', fy1', and mx1' having higher precision can be obtained.

$$fx1'=fx1-fsx1$$
$$fz1'=fz1-fsz1$$
$$fy1'=fy1-fsy1$$
$$mx1'=mx1-msx1 \quad (6)$$

By applying fx1', fz1', fy1', and mx1' obtained as described above to fx', fz', fy', and mx' of formulas (1)', (3)' and (5)', the calibration coefficient can be obtained by the techniques of the first to third embodiments.

As illustrated in FIG. 5, on obtaining the multiple "rolling test data" that are primarily independent, measurement is performed by rotating the tire T in the normal rotation direction first. Then, the rotational direction of the tire T is reversed, and the load component or the torque component is measured with the test load and the skim load divided twice in a counterclockwise direction (CCW). Another rolling test data may be collected by formula (7).

$$fx2'=fx2-fsx2$$
$$fz2'=fz2-fsz2$$
$$fy2'=fy2-fsy2$$
$$mx2'=mx2-msx2 \quad (7)$$

By applying fx2', fz2', fy2', and mx2' obtained as described above to fx', fz', fy', and mx' of formulas (1)', (3)' and (5)', the calibration coefficient can be obtained by the techniques of the first to third embodiments.

The "rolling test data" obtained in this way are data from which the load component or the torque component derived from the rotational friction occurring at the bearings of the spindle 5 or the traveling drum 3 is subtracted. By using such data having a small error component, the crosstalk correction coefficient can be calibrated in a more reliable and accurate way.

The embodiment disclosed herein should be considered to be illustrative in every way but not restrictive. Especially, in the embodiment disclosed herein, matters that are not obviously disclosed, such as driving or operating conditions, various parameters, and dimensions, weights, and volumes of constituents, employ values that can be easily predicted by those having ordinary skill in the art without departing from the scope which the person skilled in the art typically carries out.

For example, the crosstalk influence of fz' on fx, that is, only the crosstalk correction coefficient a can be calibrated by a method other than those of the above embodiments.

The present invention has been described in detail or with reference to specified embodiments, but it will be apparent to those skilled in the art that the present invention may be changed or modified in various ways without departing from the spirit or scope of the present invention. Priority is claimed on Japanese Patent Application No. 2012-138368, filed on Jun. 20, 2012, the content of which is incorporated herein by reference.

EXPLANATION OF REFERENCE NUMERALS

1: rolling resistance testing machine
2: simulated traveling road surface
3: traveling drum
4: carriage
4a: vertical wall section
5: spindle
6: motor
7: multi-component force detector
8: housing
9: linear guide
10: hydraulic cylinder
11: controller
12: measuring section
13: calibrating section
14: load tester
15: bearing
T: tire

The invention claimed is:

1. A calibration method for a multi-component force detector provided for a rolling resistance testing machine that has a spindle on which a testing tire is mounted and a traveling drum with a simulated traveling road surface against which the testing tire is pressed, the calibration method comprising:
  performing a rolling test using at least one reference tire mounted on the spindle, the reference tire being other than the testing tire and having a predetermined rolling resistance value to thereby obtain rolling test data made up of a force measured by the multi-component force detector during the test using the reference tire; and
  calibrating a crosstalk correction coefficient for correcting an influence of crosstalk occurring at the multi-component force detector using the rolling test data and the rolling resistance value of the reference tire.

2. The calibration method for a multi-component force detector provided for a rolling resistance testing machine according to claim 1, wherein
  the multi-component force detector is mounted on the spindle; and
  when a tangential direction of the traveling drum is set as an x axis, a shaft center direction of the spindle is set as a y axis, and a direction of a load applied to the tire is set as a z axis, the multi-component force detector measures, among a force acting in an x-axial direction, a force acting in a y-axial direction, a force acting in a z-axial direction, and moment around the x axis, moment around the y axis, and moment around the z axis, two or more containing at least the force acting in the x-axial direction and the force acting in the z-axial direction.

3. The calibration method for a multi-component force detector provided for a rolling resistance testing machine to claim 2, wherein, when configured to measure the force acting in the x-axial direction, the force acting in the z-axial direction, and the moment around the x axis, the multi-component force detector calibrates a crosstalk correction coefficient of the force acting in the z-axial direction relative to the force acting in the x-axial direction and a crosstalk correction coefficient of the moment around the x axis relative to the force acting in the x-axial direction using the rolling test data which contains the force acting in the x-axial direction, the force acting in the z-axial direction, and the moment around the x axis, and at least two types of which are primarily independent.

4. The calibration method for a multi-component force detector provided for a rolling resistance testing machine according to claim 2, wherein, when configured to measure the force acting in the x-axial direction, the force acting in the z-axial direction, and the force acting in the y-axial direction, the multi-component force detector calibrates a crosstalk correction coefficient of the force acting in the z-axial direction relative to the force acting in the x-axial direction and a crosstalk correction coefficient of the force acting in the y-axial direction relative to the force acting in the x-axial direction using the rolling test data which contains the force acting in the x-axial direction, the force acting in the z-axial direction, and the force acting in the y-axial direction, and at least two types of which are primarily independent.

5. The calibration method for a multi-component force detector provided for a rolling resistance testing machine according to claim 2, wherein, when configured to measure the force acting in the x-axial direction, the force acting in the z-axial direction, the force acting in the y-axial direction, and the moment around the x axis, the multi-component force detector calibrates a crosstalk correction coefficient of the force acting in the z-axial direction relative to the force acting in the x-axial direction, a crosstalk correction coefficient of the force acting in the y-axial direction relative to the force acting in the x-axial direction, and a crosstalk correction coefficient of the moment around the x axis relative to the force acting in the x-axial direction using the rolling test data which contains the force acting in the x-axial direction, the force acting in the z-axial direction, the force acting in the y-axial direction, and the moment around the x axis, and at least three types of which are primarily independent.

6. The calibration method for a multi-component force detector provided for a rolling resistance testing machine according to claim 2, wherein the calibration method includes:

obtaining a differential load by which a measurement value of the multi-component force detector which is obtained when the tire is pushed by a load different from a test load is subtracted from a measurement value of the multi-component force detector which is obtained when the tire is pushed against the traveling drum by the test load; and calibrating the crosstalk correction coefficient using the differential load as the rolling test data.

* * * * *